US006956849B1

(12) United States Patent
Yip et al.

(10) Patent No.: US 6,956,849 B1
(45) Date of Patent: Oct. 18, 2005

(54) BANDWIDTH MANAGEMENT AND CONNECTION ADMISSION CONTROL IN A NETWORK

(75) Inventors: Man Pak Yip, Sunnyvale, CA (US); Vijayaraghavan Doraiswami, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 09/728,908

(22) Filed: Dec. 1, 2000

(51) Int. Cl.$^7$ .............................................. H04L 12/50
(52) U.S. Cl. .................................. 370/359; 370/395.21
(58) Field of Search ................................ 370/229–235, 370/252, 253, 395.21, 395.4, 395.41, 395.42, 370/395.43, 359, 360, 396, 395.5, 419

(56) References Cited

U.S. PATENT DOCUMENTS 6,067,301 A * 5/2000 Aatresh ...................... 370/418

* cited by examiner

*Primary Examiner*—Wellington Chin
*Assistant Examiner*—Brenda Pham
(74) *Attorney, Agent, or Firm*—Blakely, Sokoloff, Taylor & Zafman LLP

(57) ABSTRACT

A line card within a switching node coupled to a network is described. The line card includes a link interface for transmitting communications along a communication link within the network. The link interface further includes multiple logical interfaces having one or more partitions and one or more buffers. The partitions and the buffers accommodate multiple classes of service requirements for the communications transmitted within the network. In one embodiment, bandwidth management and connection admission control in a network encompasses both the line card and the system which uses the line card.

25 Claims, 11 Drawing Sheets

BANDWIDTH MANAGEMENT AND CONNECTION ADMISSION CONTROL IN A NETWORK

FIELD OF THE INVENTION

The present invention relates generally to telecommunication systems and, more particularly, to multi-level bandwidth management and connection admission control in a network.

BACKGROUND OF THE INVENTION

ATM is a switching and multiplexing technique designed for transmitting digital information, such as data, video, and voice, at high speed, with low delay, over a telecommunications network. The ATM network includes a number of switching nodes coupled through communication links. In the ATM network, bandwidth capacity is allocated to fixed-sized units named "cells." The communication links transport the cells from a switching node to another. These communication links can support many virtual connections, also named channels, between the switching nodes. The virtual connections, for example a Virtual Channel Connection (VCC) or a Permanent Virtual Circuit (PVC), ensure the flow and delivery of information contained in the cells.

The ATM Forum, which is a user and vendor group establishing ATM standards, has also defined several ATM service categories, used in characterization of a virtual connection. For example, among such service categories are (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

SUMMARY OF THE INVENTION

A line card within a switching node coupled to a network is described. The line card includes a link interface for transmitting communications along a communication link within the network. The link interface further includes multiple logical interfaces having one or more partitions and one or more buffers. The partitions and the buffers accommodate multiple classes of service requirements for the communications transmitted within the network.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
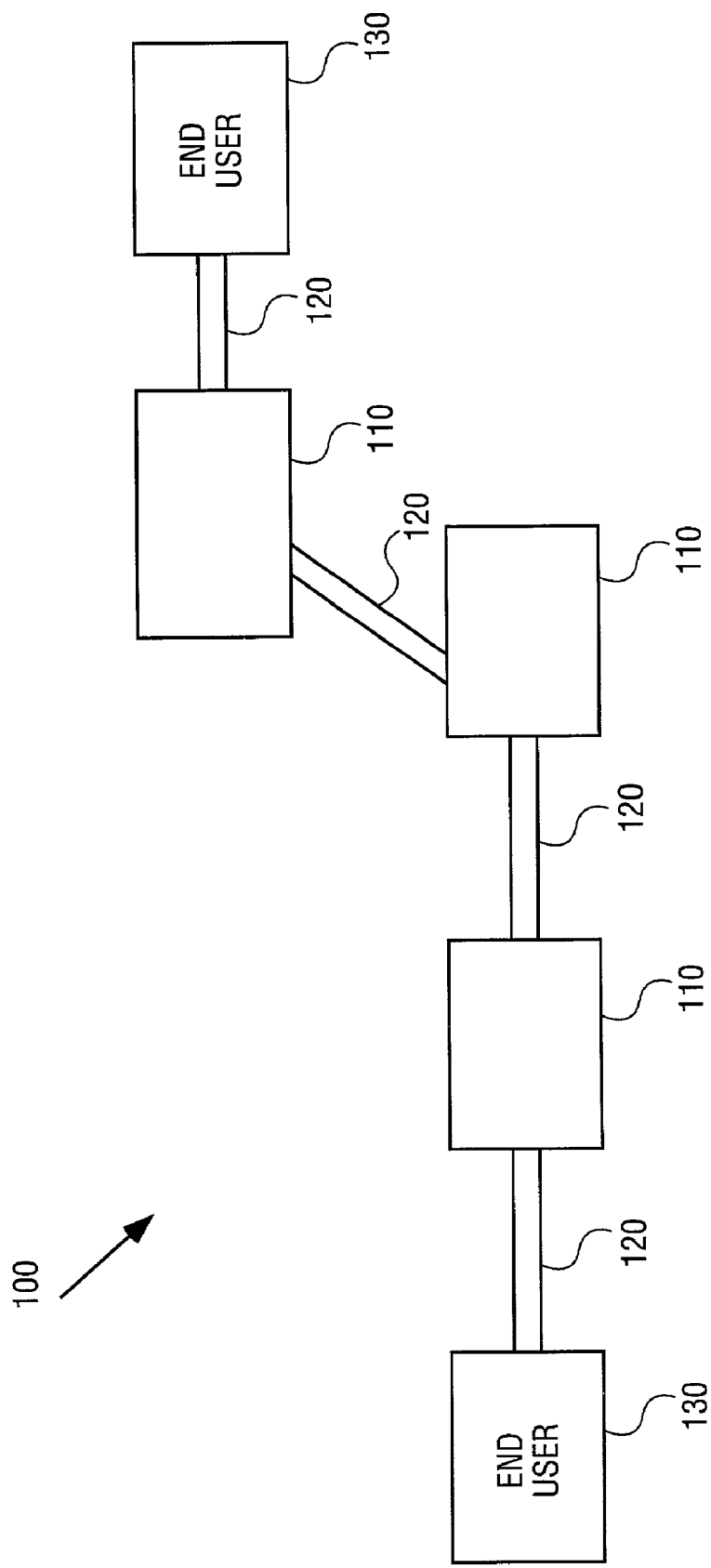
FIG. 1 is a block diagram of a network.

FIG. 1 is a block diagram of a network 100, including several network nodes, also known as switching nodes, 110 connected through single communication links 120. Network 100 is a multi-service network with guaranteed bandwidth and quality of service. Typically, end users 130 access the network 100 and connect to the nodes 110 via similar links 120. Generally, the illustrated communication links 120 carry traffic from many sources to many destinations and may support multiple virtual connections. Although these virtual connections may be statistically multiplexed onto the same link, the network 100 must still meet certain class of service (CoS) requirements for each connection. Therefore, the network must allocate an appropriate bandwidth to each connection without disturbing the other connections already in traffic.

Attempts made to allocate the appropriate bandwidth to each connection have resulted in a Connection Admission Control (CAC) process, which uses source traffic characteristics, such as peak cell rate (PCR), sustained cell rate (SCR), minimum cell rate (MCR), burstiness, and peak duration, and the required quality of service parameters, such as cell loss ratio, cell transfer delay, and jitter, to make a decision whether to accept or reject the connection and to access the amount of bandwidth required by the connection. In the network 100, a user 130 and the network negotiate a traffic contract, whereby the user supplies the traffic characteristics, and the desired quality of service, and the network performs a CAC process to determine whether there is enough free bandwidth to accept the connection. If the network carries voice communications, such as voice calls, and certain cells are dropped, then the voice calls will suffer degraded voice quality.

Figure 2:
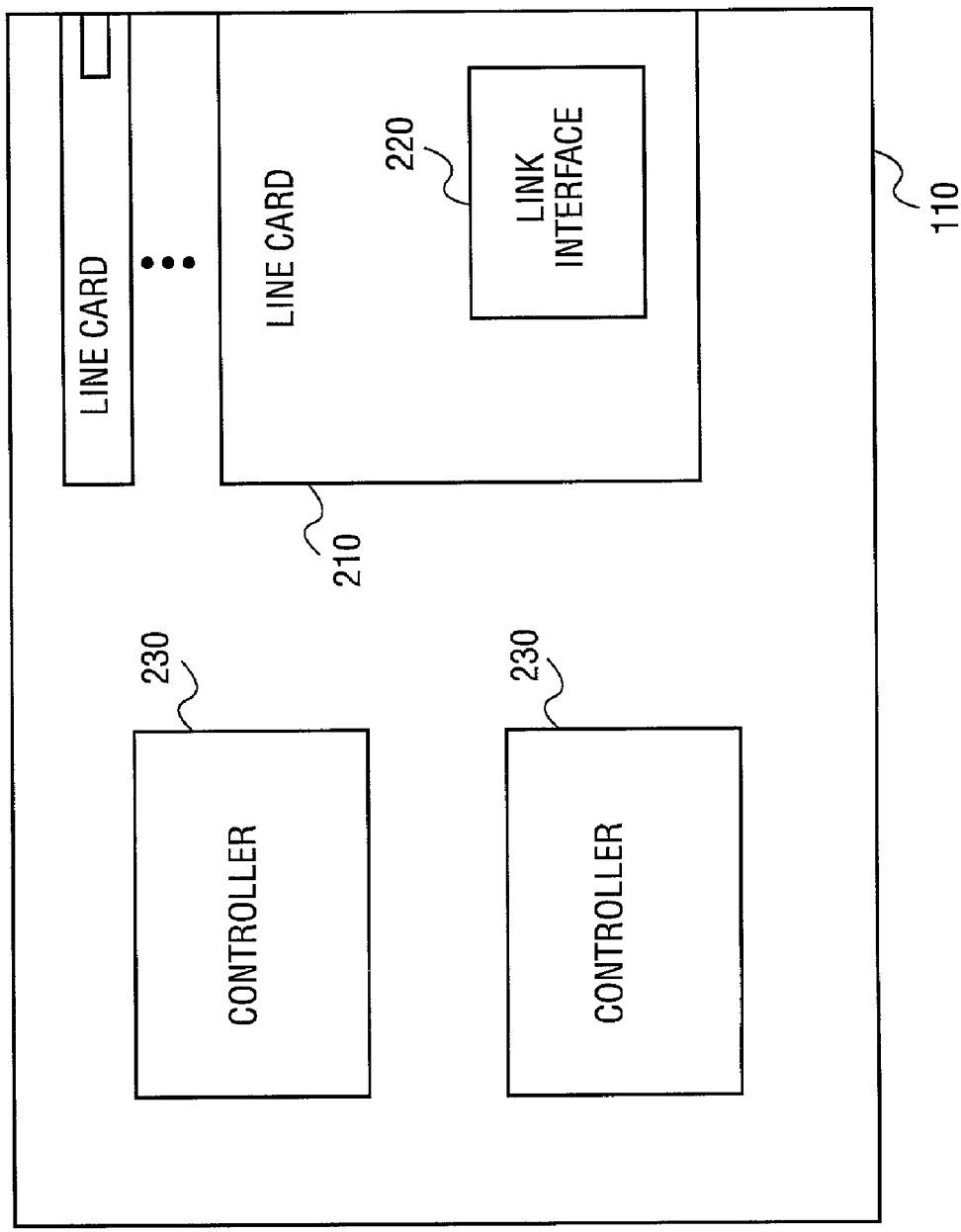
FIG. 2 is a block diagram of one embodiment of a switching node within the network.

FIG. 2 is a block diagram of one embodiment of a switching node within the network 100. As illustrated in FIG. 2, switching node 110 includes a line card 210 and several controllers 230, of which only two controllers are shown. In one embodiment, line card 210 further includes a link interface 220, for example an optical link interface, also called a port line or physical interface. Line card 210 is coupled to a communication link 120 shown in FIG. 1, which connects switching node 110 with other switching nodes within network 100. Each controller 230 establishes new connections to be added to the network 100 and controls the CoS requirements for each connection.

Figure 3:
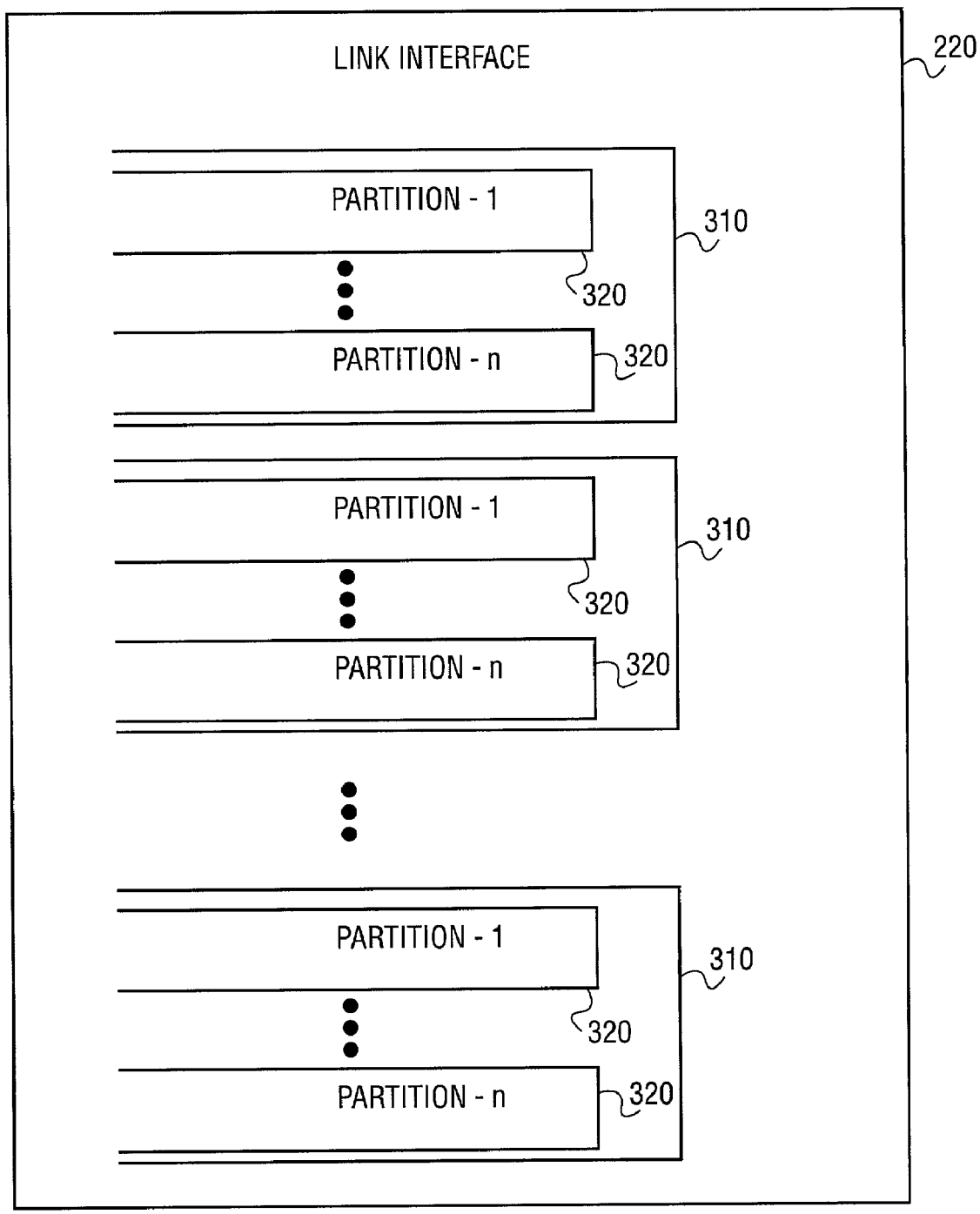
FIG. 3 is a block diagram of a software implementation of one embodiment of a link interface within the switching node.

FIG. 3 is a block diagram of a software implementation of one embodiment of a link interface. As illustrated in FIG. 3, link interface 220 includes multiple logical interfaces 310.

In one embodiment, logical interfaces 310 are also known as virtual interfaces. Each logical interface 310 is an abstraction on top of a link interface 220 and is further configured to include several resource partitions 320, illustrated as PARTITION-1 through PARTITION-n. Each resource partition 320 is controlled or used by a controller 230 shown in FIG. 2. Resource partition is the controller's view of logical interface. Each partition 320 accommodates one or more CoS requirements. For example a voice quality requirement for the particular connection can be accommodated along with video quality requirement for another connection in the same partition.

Figure 4:
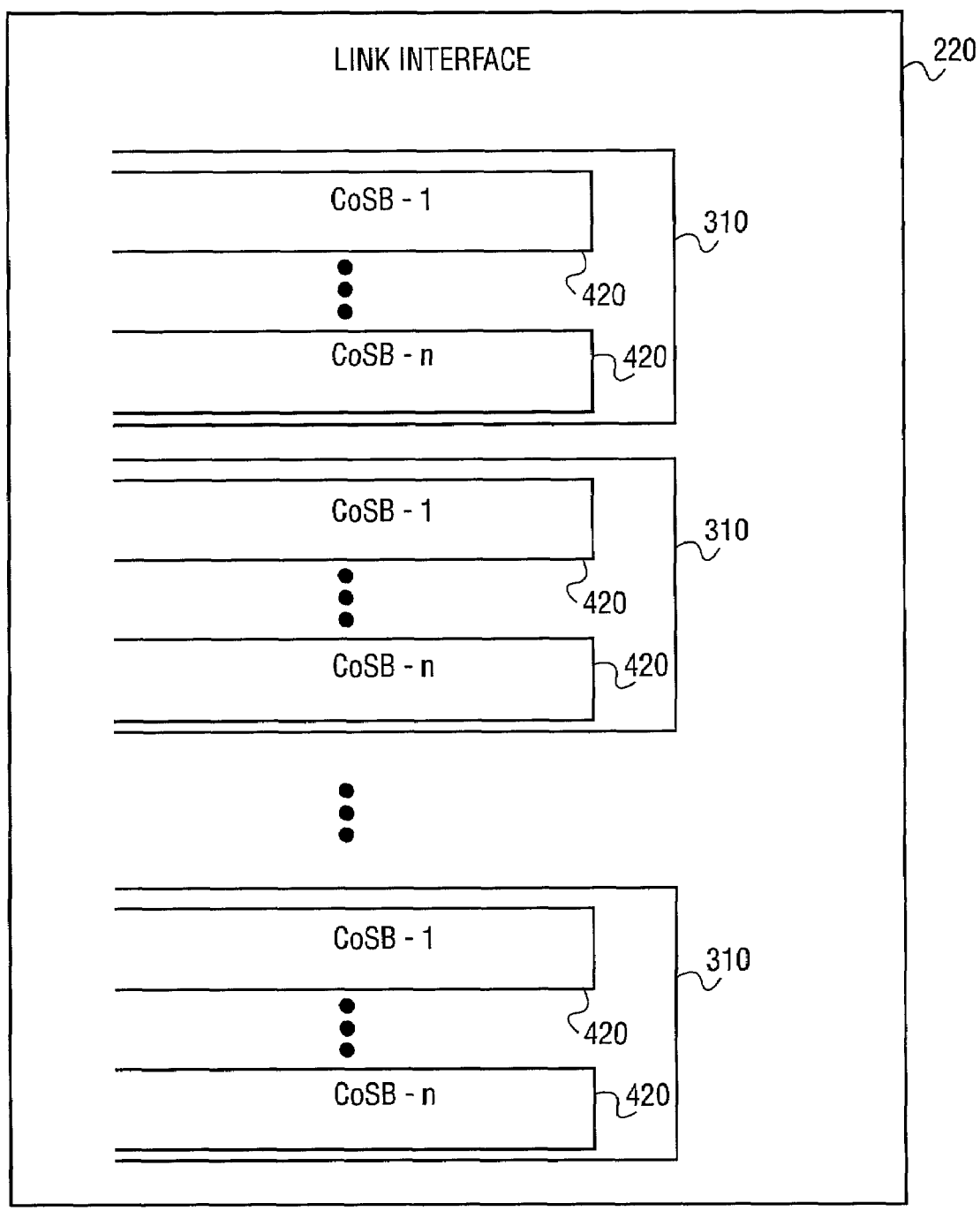
FIG. 4 is a block diagram of a hardware implementation of one embodiment of the link interface.

FIG. 4 is a block diagram of a hardware implementation of one embodiment of the link interface 220. As illustrated in FIG. 4, each logical interface 310 within link interface 220 further includes several class of service buffers (CoSB) 420, illustrated as CoSB-1 through CoSB-n. In one embodiment, each CoSB 420 is configured independently to deliver one or more CoS requirements for the collection of connections. In one embodiment, there are sixteen CoSBs within each logical interface 310.

In one embodiment, the configuration of line card 210 is implemented before accepting a request to add a connection. The process of configuring line card 210 includes but not limited to configuration of logical interfaces 310 within link interface 220 and configuration of partitions 320 and CoSBs 420 within each logical interface 310.

In one embodiment, when a logical interface 310 is configured, the combined capacity of all logical interfaces 310 in a link interface 220 must not exceed a predetermined capacity C of the link interface 220. For example, if an OC-3 communication link is coupled to link interface 220 within line card 210, the combined capacity of all logical interfaces 310 may not exceed the capacity of an OC-3 link.

Similarly, when a partition 320 or a CoSB 420 is configured within a logical interface 310, the combined capacity of the classes of service within the partitions, or the combined capacity of all CoSBs 420, may not exceed the capacity of the logical interface 1220. These conditions must be satisfied in order to guarantee to a user a quality of service for that particular connection.

In one embodiment, the logical interface 310 includes multiple configured partitions 320. Each partition 320 requires guaranteed bandwidth allocated for each of its CoS requirements. Therefore, more than one partition 320 may have to share the same CoSB for a particular CoS requirement. As a result, a minimum and a maximum of the CoS requirement has to be verified against both a minimum and a maximum of the capacity of all partitions and a minimum and a maximum of the capacity of the CoSB.

The basic functionality achieved through the configuration is sharing of resources, for example sharing of the available bandwidth among various entities. Any bandwidth that is available for sharing is put in a shared pool. Initially, all resources are in the shared pool. Each of the participating entities are guaranteed a minimum bandwidth value and, based on availability, can use up to a maximum value. As the entities ask for the minimum amount of bandwidth, the guaranteed minimum is taken from the shared pool and given to that entity. As a result, the bandwidth remaining after the allocation of the guaranteed minimum remains part of the shared pool, also called the common pool. When the entity exceeds the guaranteed minimum, the bandwidth excess is allocated from the shared pool.

When a new entity is configured, if the bandwidth available in the shared pool is not enough for the new entity, because some other entity is using more than its guaranteed minimum, but if the sum of all minimums of the entities, including the new entity, is less than the total available bandwidth, then the new entity configuration is accepted. The new entity is marked as having a deficit in bandwidth, and receives the available bandwidth, the deficit bandwidth being made available as soon as it becomes available within the resource pool.

For example, in one embodiment, minimum and maximum bandwidth requirements for each class of service CoS are represented as a percentage of the minimum and maximum partition bandwidth. Each CoS in a partition is guaranteed its minimum bandwidth, but it is not stopped from using more than its minimum, up to the maximum bandwidth, if available in the common pool of the partition.

Similarly, in an alternate embodiment, the partition can use more than its guaranteed minimum, if available in the common pool of the logical interface. If one partition is using more than its guaranteed minimum, and if a new partition is being added, the new partition may not receive the guaranteed minimum bandwidth since the difference between the total capacity of the logical interface and a sum of the bandwidth used by the other partitions in the logical may be less than the minimum bandwidth required by the new partition. However, if the sum of the minimum required bandwidth of all partitions, including the new partition to be added, is less than the total capacity of the logical interface, the configuration request to add a new partition is accepted. The new partition will receive its minimum allocated bandwidth as soon as more bandwidth becomes available.

In one embodiment, the sum of the minimum required bandwidth of all CoSs in a partition $Part_{i,j}$, where $i=1, \ldots, m$ and identifies the logical interface 310 and $j=1, \ldots, n$ identifies the partition 320 within that logical interface, should be less than the minimum bandwidth of that partition, $Part_{i,j}^{min}$, $$\left[ \sum_{a=1, a \in Part_{i,j}}^{MaxCoS} CoS_a^{min} \leq Part_{i,j}^{min} \right]_{j=1}^{MaxPartitions}$$

The equation has to be verified for all partitions within the particular logical interface.

The sum of the minimum required bandwidth of all CoSs in a class of service buffer $CoSB_{i,k}$, where $i=1, \ldots, m$ and identifies the logical interface and $k=1, \ldots, n$ and identifies the CoSB within the logical interface, should be less than the minimum bandwidth of that class of service buffer, $CoSB_{i,k}^{min}$.

$$\left[ \sum_{a1=, a \in CoSB_{i,k}}^{MaxCoS} CoS_a^{min} \leq CoS_{i,k}^{min} \right]_{k=1}^{MaxCoSB}$$

The equation has to be verified for all CoSBs within that particular logical interface.

The sum of the minimum required bandwidth of all the partitions Part in a logical interface $SG_i$, where $i=1, \ldots, m$, should be less than the minimum bandwidth of that logical interface, $SG_i^{min}$.

$$\left[\sum_{j=1}^{MaxPartitions} Part_{i,j}^{min} \leq SG_i^{min}\right]_{i=1}^{MaxSG}$$

The sum of the minimum bandwidth of all CoSBs $CoSB_{1,k}$ in the logical interface $SG_1$ should be less than the minimum bandwidth of that logical interface, $SG_i^{min}$.

$$\left[\sum_{k=1}^{MaxCoSBx} CoSB_{i,k}^{min} \leq SG_i^{min}\right]_{i=1}^{MaxSG}$$

Finally, the sum of the minimum bandwidth of all logical interfaces $SG_i$ should be less than the link capacity C.

$$\left[\sum_{i=1}^{MaxSGs} SG_i^{min} \leq C\right]$$

When a request to add a connection is received and a connection needs to be added, its class of service type (CoS) has to be specified. Therefore, considering a connection having a non-zero bandwidth requirement, the minimum and maximum bandwidth of the CoS, as well as the minimum and maximum bandwidths of both the partition and logical interface in which the connection is added, have to be verified.

First, the new current bandwidth value of the CoS is calculated using the following formula;

$$CoS_a^{\beta,new} = CoS_a^{\beta} + X_{a,m}$$

where 'a' identifies the class of service CoS within the partition or the CoSB, and $X_{a,m}$ is the bandwidth of the $m^{th}$ connection in the class of service to be added.

If the new current bandwidth value of the CoS is less than a maximum bandwidth value of the CoS, $$CoS_a^{\beta,new} \leq CoS_a^{max}$$

then the connection is added. Otherwise the request to add the connection is rejected.

Next, a new bandwidth value is calculated for the partition in which the connection is to be added. The new partition bandwidth value is the sum of the MAX{current bandwidth usage of the CoS, minimum bandwidth of the Cos} excluding the CoS in which the connection is added, plus the MAX{new current bandwidth usage of the CoS in which the connection is added, minimum bandwidth of the CoS in which the connection is added}.

$$Part_{i,j}^{\beta,new} = \sum_{b=1,a\neq b}^{MaxCoS} \max(CoS_b^{\beta}, CoS_b^{min}) + \max(CoS_a^{\beta,new}, CoS_a^{min})$$

In the above equation, the summation is done for 'b' from 1 to maximum CoS in partition $Part_{i,j}$, except for CoS "a". If $$Part_{i,j}^{\beta,new} \leq Part_{i,j}^{max}$$

then the connection is added. Otherwise, the request to add the connection is rejected.

Next, a new bandwidth value is calculated for the CoSB in which the connection is to be added. As stated in the above description, the CoSB bandwidth can be calculated with the following formula:

$$CoSB_{i,k}^{\beta,new} = \sum_{b=1,a\neq b}^{MaxCoS} \max(CoS_b^{\beta}, CoS_b^{min}) + \max(CoS_a^{\beta,new}, CoS_a^{min})$$

If $$CoSB_{i,k}^{new} \leq CoSB_{i,k}^{max}$$

then the connection is added. Otherwise, the request to add the connection is rejected.

Next, a new bandwidth value is calculated for the logical interface in which the connection is to be added. This equation has two parts, one part for the partition usage, as a sum of the current usage for all the partitions except the partition in which the connection is added plus the partition bandwidth calculated above, and the second part for the CoSB usage, as a sum of the current usage for all the CoSBs except for the CoSB in which the connection is added plus the CoSB bandwidth calculated above. The maximum value of the two parts of the equation is the new logical interface bandwidth value.

$$SG_i^{\beta,new} = \max\{SG_i^{min}, U, V\}$$

where 'U' and 'V' are expressed as follows, $$U = \sum_{k=1,new\neq k}^{MaxCoSBs} CoSB_{i,k}^{\beta} + CoSB_{i,k}^{\beta,new}$$

$$V = \sum_{j=1,new\neq j}^{MaxPartition} Part_{i,j}^{\beta} + Part_{i,j}^{\beta,new}$$

If $$SG_i^{\beta,new} \leq SG_i^{max}$$

then the connection is added. Otherwise, the request to add the connection is rejected.

Finally, the new bandwidth value of all logical interfaces must not exceed the link capacity C. Therefore:

$$\sum_{i=1,new\neq i}^{MaxSGs} SG_i^{\beta} + SG_i^{\beta,new} \leq Capacity$$

Figure 5:
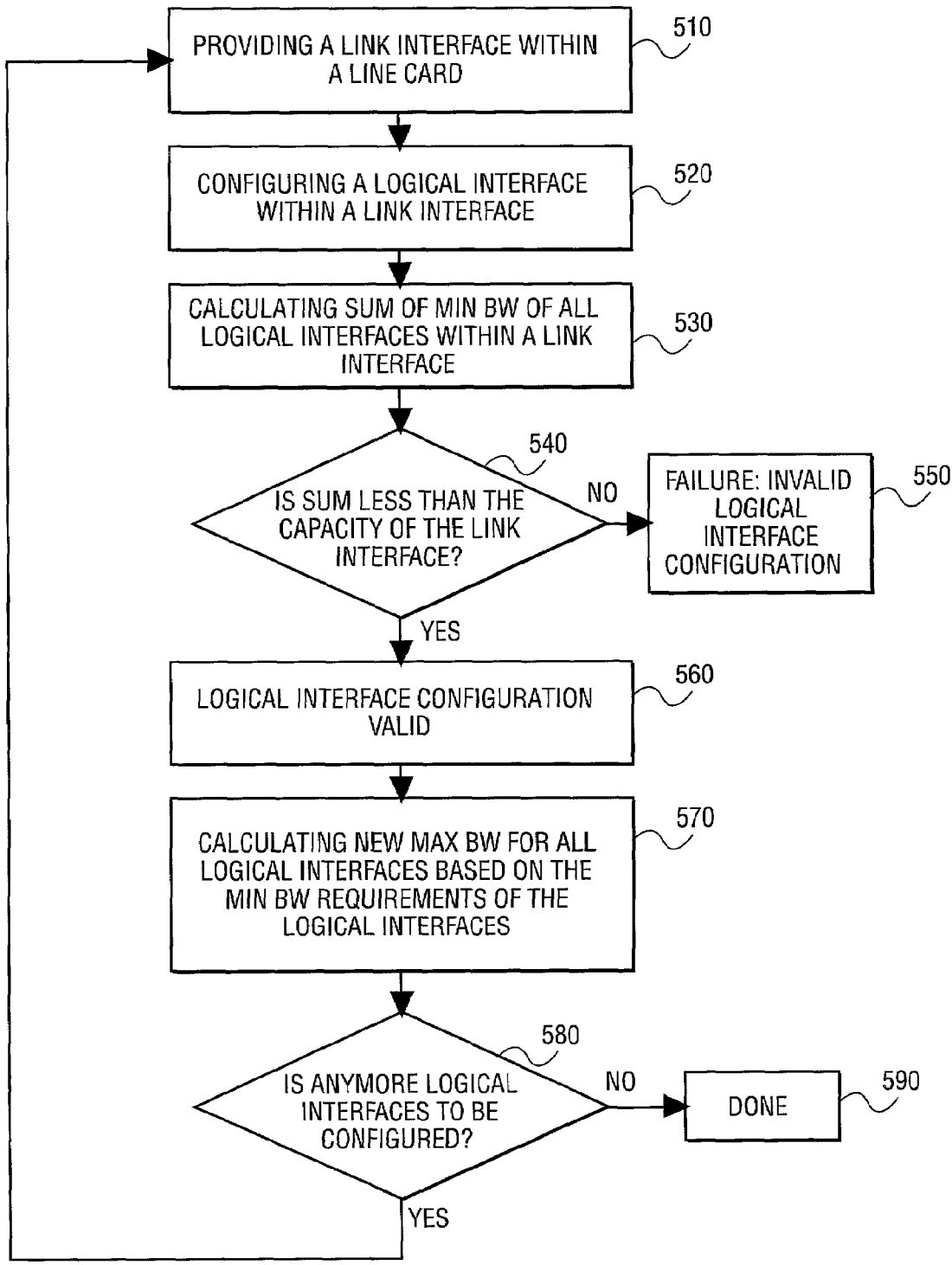
FIG. 5 is a flow diagram of one embodiment of a method for a logical interface configuration and verification sequence.

FIG. 5 is a flow diagram of one embodiment of a method for a logical interface configuration and verification sequence. As illustrated in FIG. 5, at block 510, a link interface is provided within the line card. At block 520, a logical interface is configured within a link interface. At block 530, a sum of the minimum bandwidth of all logical interfaces within a link interface is calculated. At block 540, whether the sum is less than the capacity of the link interface is determined. If the sum is not less than the capacity, the logical interface configuration is invalid and is labeled as a failure, block 550. If the sum is less than the capacity, the logical interface configuration is valid, block 560. A new maximum bandwidth for all logical interfaces is calculated based on the minimum bandwidth requirements of the logical interfaces, block 570. If any more logical interfaces are to be configured, block 580, the process returns to block 510. Otherwise, the process is done, block 590.

Figure 6:
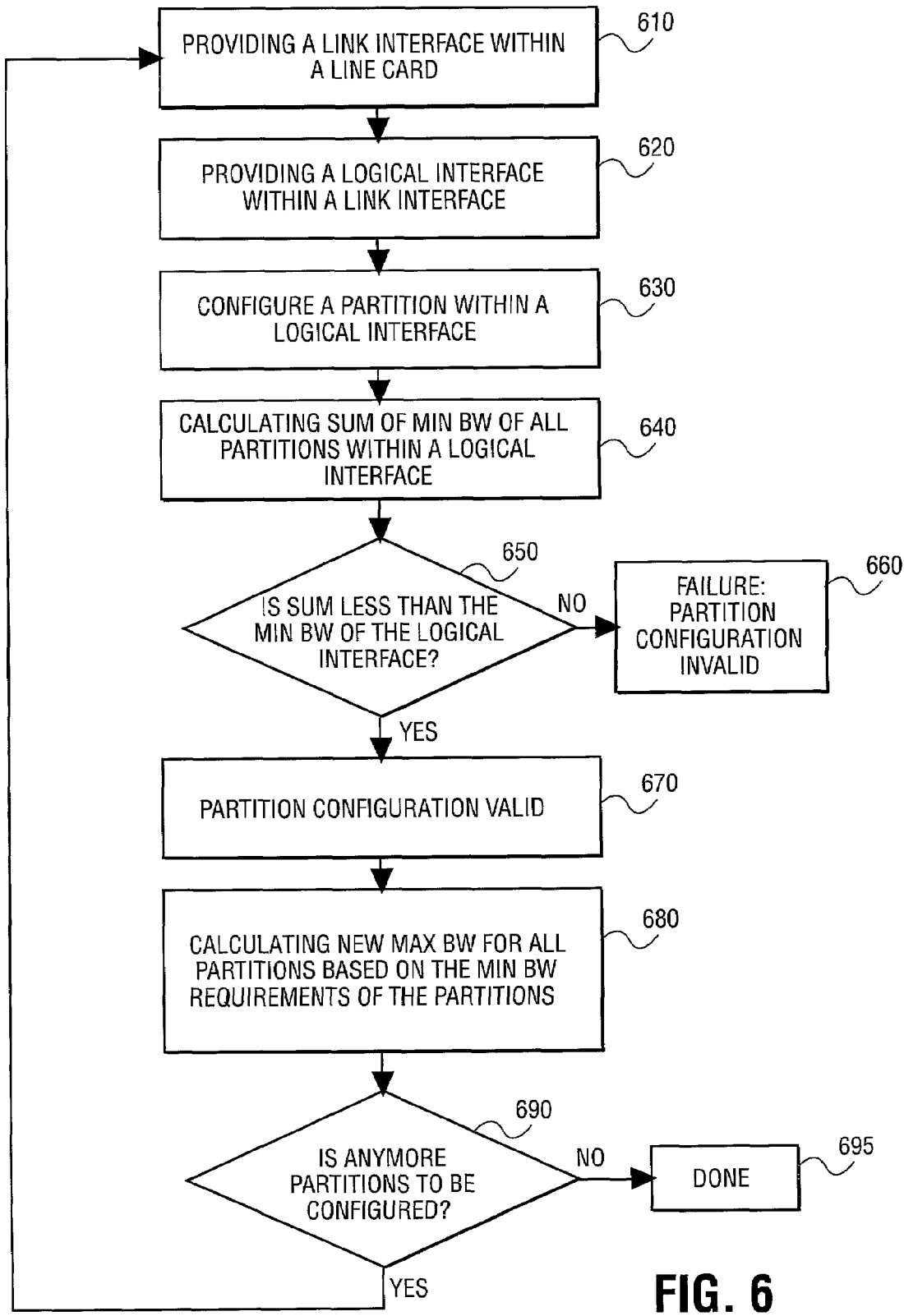
FIG. 6 is a flow diagram of one embodiment of a partition configuration and verification sequence.

FIG. 6 is a flow diagram of one embodiment of a partition configuration and verification sequence. A link interface is provided within the line card, 610. At block 620, a logical interface is configured within a link interface. A partition is configured within a logical interface, 630. At block 640, a sum of the minimum bandwidth of all partitions within a logical interface is calculated. At block 650, whether the sum is less than the minimum bandwidth of the logical interface is determined. If the sum is not less than the minimum bandwidth, the partition configuration is invalid and is labeled as a failure, block 660. Otherwise, the partition configuration is valid, block 670. A new maximum bandwidth for all partitions is calculated based on the minimum bandwidth requirements of the partitions, block 680. If any more partitions are to be configured, block 690, the process returns to block 610. Otherwise, the process is done, block 695.

Figure 7:
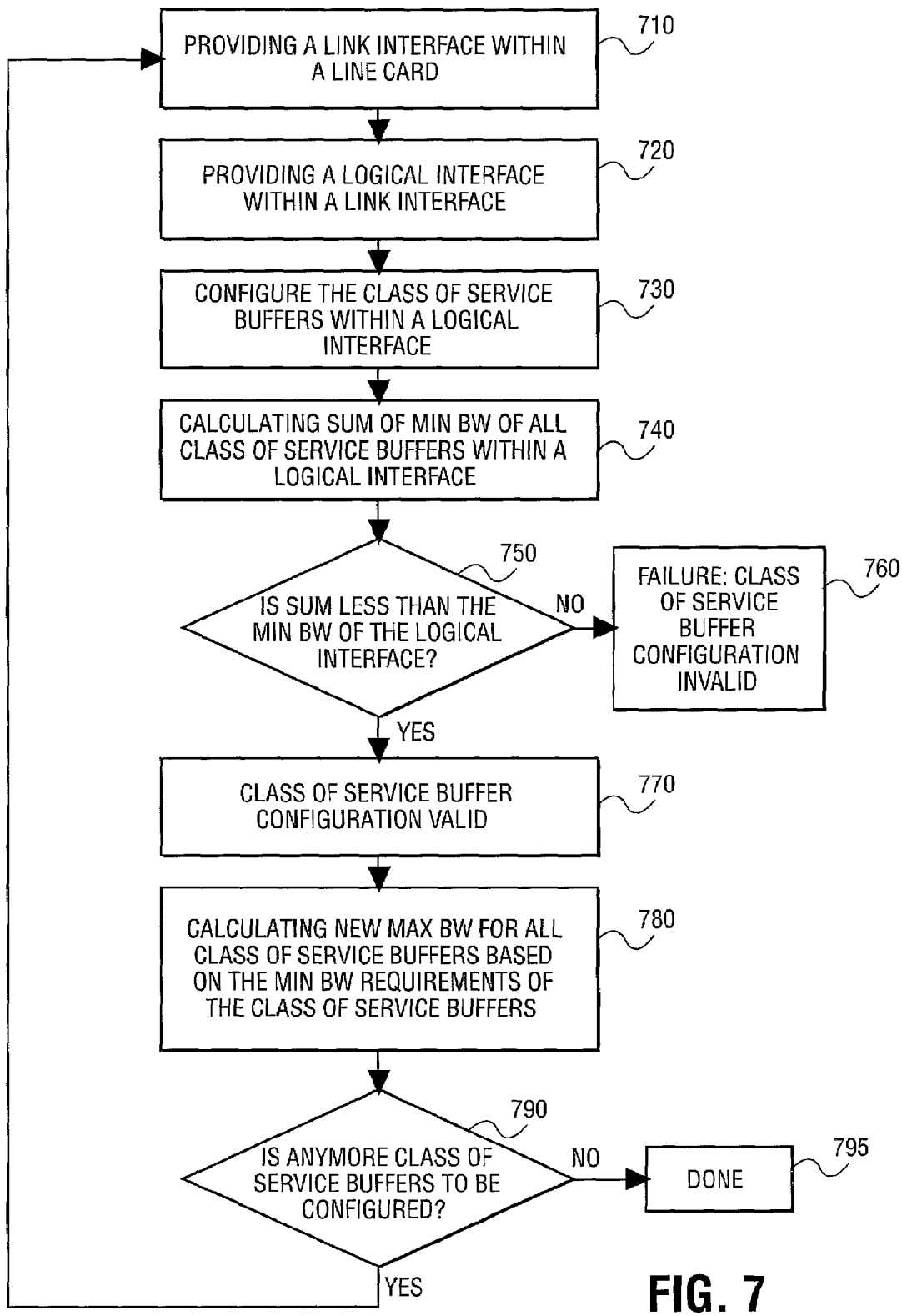
FIG. 7 is a flow diagram of one embodiment of a class of service buffer configuration and verification sequence.

FIG. 7 is a flow diagram of one embodiment of a class of service buffer configuration and verification sequence. A link interface is provided within the line card, 710. At block 720, a logical interface is configured within a link interface. Class of service buffers are configured within a logical interface, 730. At block 740, a sum of the minimum bandwidth of all class of service buffers within a logical interface is calculated. At block 750, whether the sum is less than the minimum bandwidth of the logical interface is determined. If the sum is not less than the minimum bandwidth, the class of service buffer configuration is invalid and is labeled as a failure, block 760. Otherwise, the class of service buffer configuration is valid, block 770. A new maximum bandwidth for all class of service buffers is calculated based on the minimum bandwidth requirements of the class of service buffers, block 780. If any more class of service buffers are to be configured, block 790, the process returns to block 710. Otherwise, the process is done, block 795.

Figure 8:
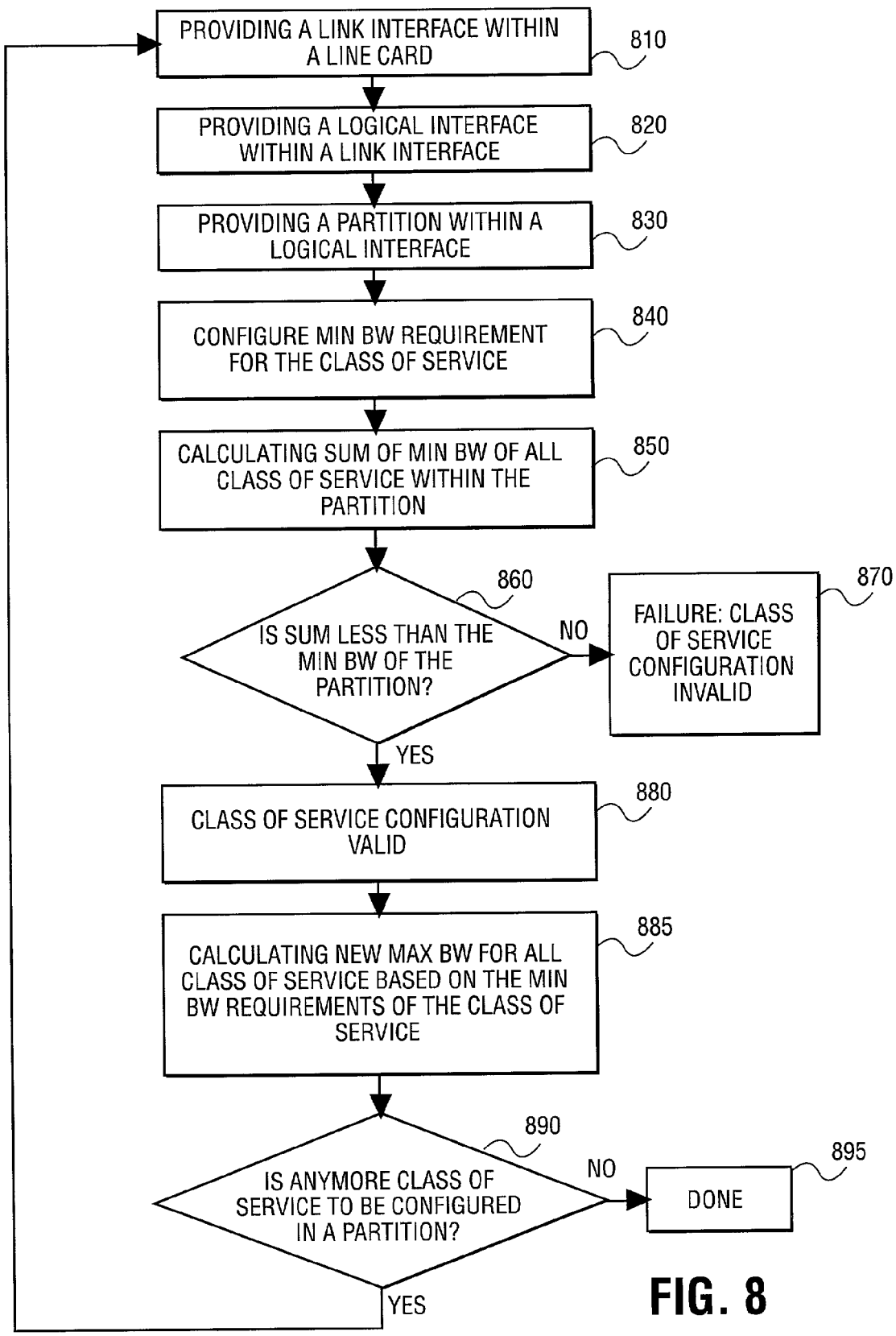
FIG. 8 is a flow diagram of one embodiment of a class of service configuration and verification sequence.

FIG. 8 is a flow diagram of one embodiment of a class of service configuration and verification sequence. A link interface is provided within the line card, 810. At block 820, a logical interface is configured within a link interface. A partition is provided within the logical interface, 830. Minimum bandwidth requirements for the class of service are configured, 840. At block 850, a sum of the minimum bandwidth of all classes of service within the partition is calculated. At block 860, whether the sum is less than the minimum bandwidth of the partition is determined. If the sum is not less than the minimum bandwidth, the class of service configuration is invalid and is labeled as a failure, block 870. Otherwise, the class of service configuration is valid, block 880. A new maximum bandwidth for all classes of service is calculated based on the minimum bandwidth requirements of each of the classes of service, block 885. If any more classes of service are to be configured, block 890, the process returns to block 810. Otherwise, the process is done, block 895.

Figure 9:
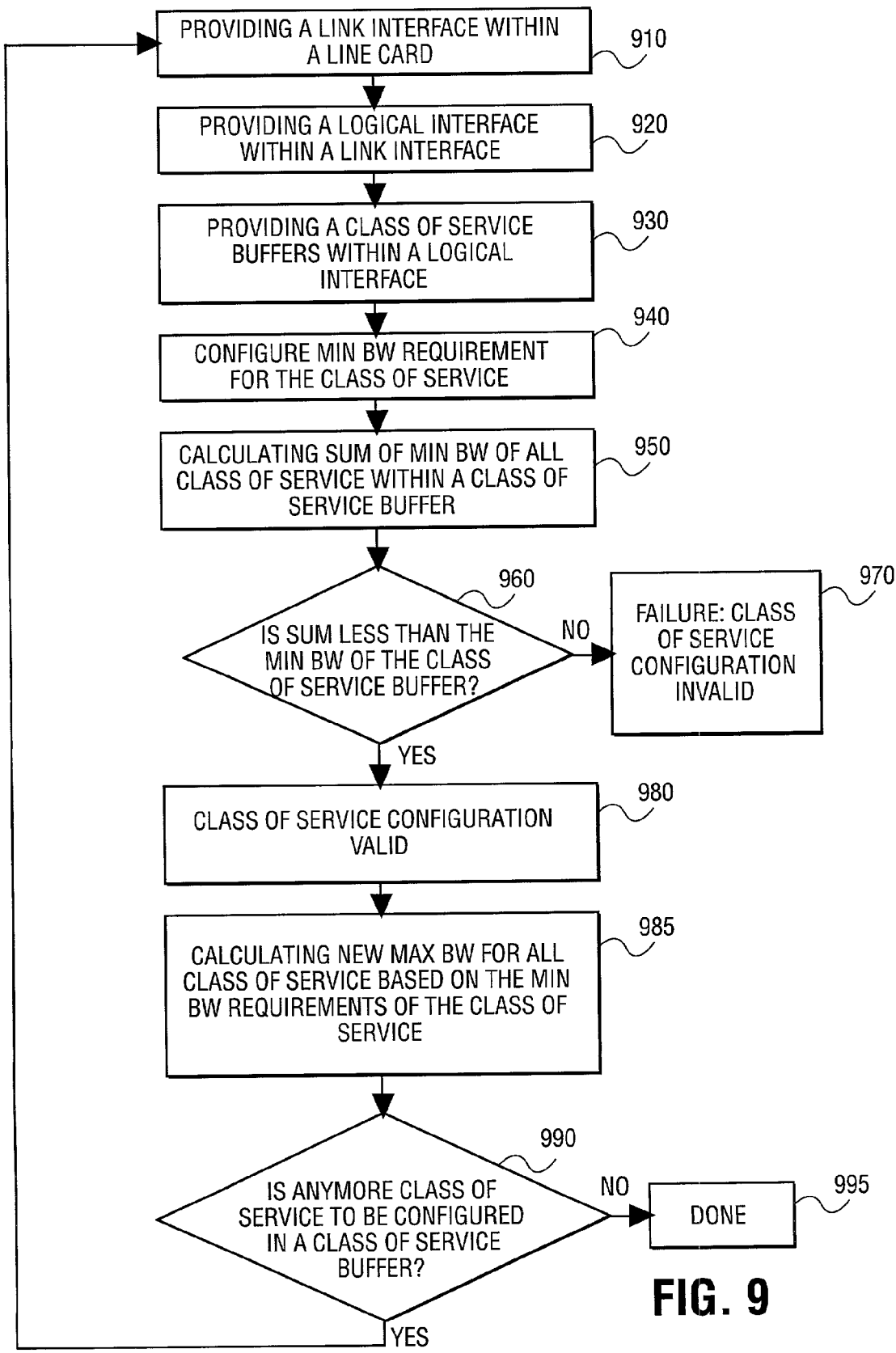
FIG. 9 is a flow diagram of one embodiment of a class of service configuration and verification within a class of service buffer.

FIG. 9 is a flow diagram of one embodiment of a class of service configuration and verification within a class of service buffer. A link interface is provided within the line card, 910. At block 920, a logical interface is configured within a link interface. Class of service buffers are provided within the logical interface, 930. Minimum bandwidth requirements for the class of service are configured, 940. At block 950, a sum of the minimum bandwidth of all classes of service within the class of service buffer is calculated. At block 960, whether the sum is less than the minimum bandwidth of the class of service buffer is determined. If the sum is not less than the minimum bandwidth, the class of service configuration is invalid and is labeled as a failure, block 970. Otherwise, the class of service configuration is valid, block 980. A new maximum bandwidth for all classes of service is calculated based on the minimum bandwidth requirements of each of the classes of service, block 985. If any more classes of service are to be configured, block 990, the process returns to block 910. Otherwise, the process is done, block 995.

Figure 10A:
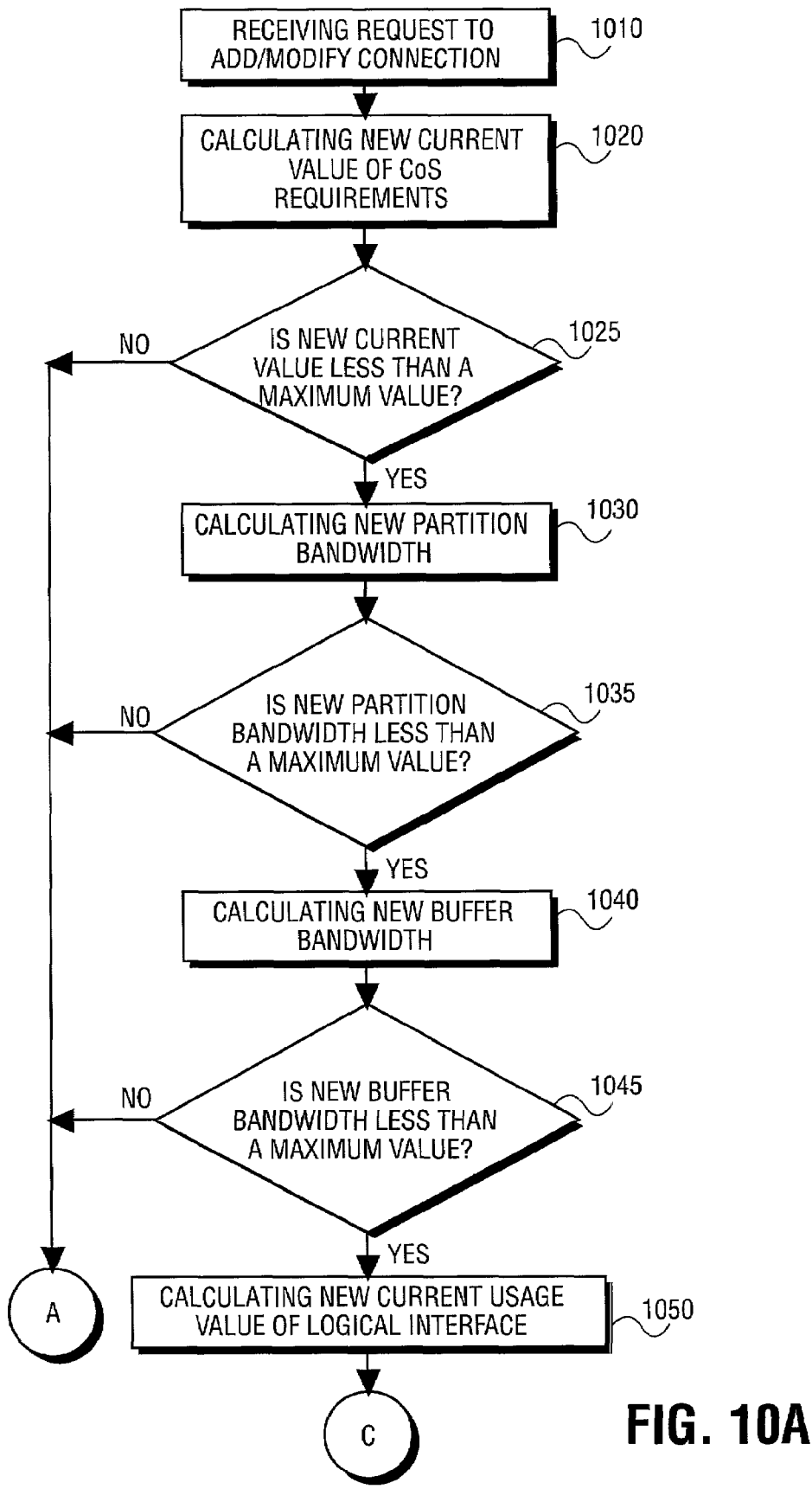
FIGS. 10A and 10B are flow diagrams of one embodiment for a method for controlling admission of a connection in a line card within a switching node coupled to a network.
Figure 10B:
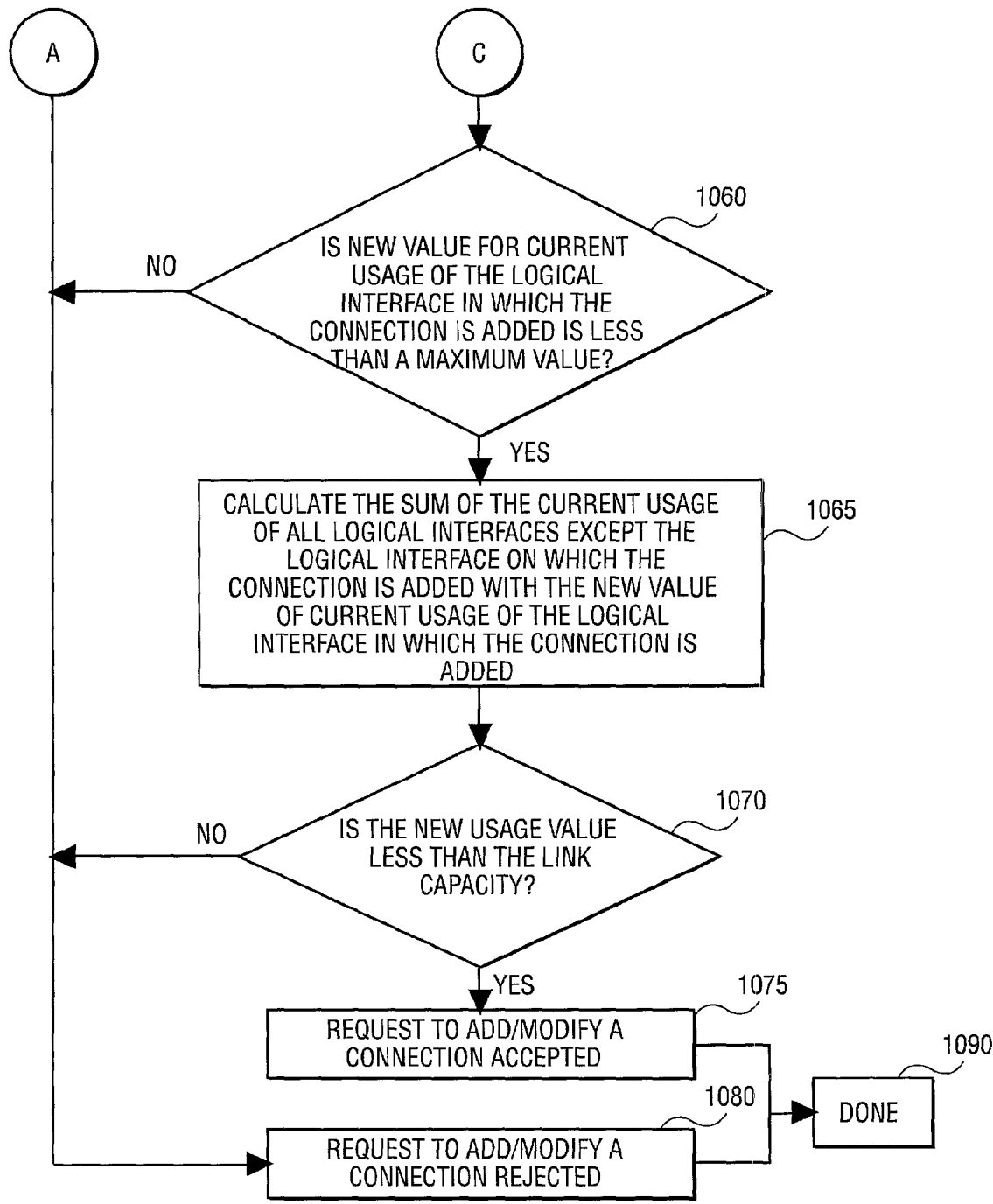

FIGS. 10A and 10B are flow diagrams of one embodiment for a method for controlling admission of a connection in a line card within a switching node coupled to a network. As illustrated in FIG. 10A, at processing block 1010, a request to add or modify a connection is received.

At processing block 1020, a new class of service current value of the class of service requirements for communications transmitted by the line card is calculated. At processing block 1025, a decision is made whether the new current value is less than a maximum value for the class of service requirements. If the new current value is greater than the maximum value, then the request to add the new connection is rejected.

Otherwise, if the new current value is less than the maximum value, at processing block 1030, a new partition bandwidth is calculated. At processing block 1035, a decision is made whether the new partition bandwidth is less than a maximum value of the partition bandwidth. If the new partition bandwidth is greater than the maximum value, the request to add the new connection is rejected.

Otherwise, if the new partition bandwidth is less than the maximum value, at processing block 1040, a new buffer bandwidth is calculated. At processing block 1045, a decision is made whether the new buffer bandwidth is less than a maximum value of the buffer bandwidth. If the new buffer bandwidth is greater than the maximum value, then the request to add the new connection is rejected.

Otherwise, if the buffer bandwidth is less than the maximum value, at processing block 1050, a now current usage value of the logical interface is calculated. At processing block 1060 shown in FIG. 10B, a decision is made whether the new current usage value is less than a maximum current usage value. If the new current usage value is greater than the maximum value, the request to add to the new connection is rejected.

As shown in FIG. 10B, if a new value for current usage of the logical interface in which the connection is added is less than a maximum value is determined, 1060, then the sum of the current usage of all logical interfaces except the logical interface on which the connection is added is calculated with the new value of current usage of the logical interface in which the connection is added, 1065. Whether the new usage is less than the link capacity is determined, 1070. If so, a request to add or modify a connection is accepted, 1075. Otherwise, the request id rejected, 1080. The process is done, 1090.

n one embodiment, the following discussion is presented in the context of a Voice over packet network, such as an Internet Protocol (EP) network. However, the present invention is not limited to IP networks and may be implemented with other types of networks, such as Frame Relay networks running on Asynchronous Transfer Mode (ATM) networks, and any protocol which can run over an ATM network. The present invention may be implemented with different types of communication paths or virtual circuits, such as Permanent Virtual Circuits (PVCs), Switched Virtual Circuits (SVCs), or a combination of PVCs and SVCs.

It is also to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media, flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A line card within a switching node coupled to a network, said line card comprising:
    a link interface for transmitting communications along a communication link within said network;
    said link interface including a plurality of logical interfaces, a sum of minimum required bandwidths of said plurality of logical interfaces being less than a link capacity;
    each of said plurality of logical interfaces including a plurality of class of service buffers (CoSBs), a sum of minimum required bandwidths of said plurality of CoSBs being less than a minimum bandwidth of each of said plurality of logical interfaces;
    each of said plurality of logical interfaces including a plurality of partitions, a sum of minimum required bandwidths of said plurality of partitions being less than a minimum bandwidth of each of said plurality of logical interfaces;
    each of said plurality of CoSBs including a first plurality of classes of service (CoSs), a sum of minimum required bandwidths of said first plurality of CoSs being less than a minimum bandwidth of each of said plurality of CoSBs;
    each of said plurality of partitions including a second plurality of CoSs, a sum of minimum required bandwidths of said second plurality of CoSs being less than a minimum bandwidth of each of said plurality of partitions; and
    wherein a first aggregation of said first plurality of CoSs for said plurality of CoSBs is the same as a second aggregation of said second plurality of CoSs for said plurality of partitions.

2. The line card of claim 1 wherein each of said plurality of CoSBs each of said plurality of partitions, and each of said first plurality of CoSs include a maximum allowable bandwidth usage and a minimum bandwidth guarantee.

3. The line card of claim 2, wherein the maximum allowable bandwidth is the maximum amount of bandwidth that each of said plurality of CoSBs, each of said plurality of partitions, and each of said first plurality of CoSs can reserve.

4. The line card of claim 2, wherein the minimum bandwidth guarantee is the guaranteed bandwidth assigned to each of said plurality of CoSBs, each of said plurality of partitions, and each of said first plurality of CoSs, such that the guaranteed bandwidth is not affected by bandwidth usage or configuration changes of any other of said plurality of CoSBs, said plurality of partitions and said first plurality of CoSs.

5. The line card of claim 2 wherein the line card checks the minimum bandwidth guarantee of each of said plurality of CoSBs, each of said plurality of partitions, and each said first plurality of CoSs.

6. The line card of claim 2 wherein the line card checks the maximum bandwidth usage of each of said plurality of CoSBs, each of said plurality of partitions, and each of said first plurality or CoSs.

7. The line card of claim 2, wherein the line card prevents a change in any of said plurality of CoSBs, said plurality of partitions, and said first plurality of CoSs if said change would result in improper minimum bandwidth relationships for the line card.

8. A method comprising:
    configuring a communication link of a network to include a plurality of logical interfaces such that a sum of minimum required bandwidths of said plurality of logical interfaces is less than a link capacity;
    configuring each of said plurality of logical interfaces to include a plurality of class of service buffers (CoSBs) such that a sum of minimum required bandwidths of said plurality of CoSBs is less than a minimum bandwidth of each of said plurality of logical interfaces;
    configuring each of said plurality of logical interfaces to include a plurality of partitions such that a sum of minimum required bandwidths of said plurality of partitions is less than a minimum bandwidth of each of said plurality of logical interfaces;
    configuring each of said plurality of CoSBs to include a first plurality of classes of service (CoSs) such that a sum of minimum required bandwidths of said first plurality of CoSs is less than a minimum bandwidth of each of said plurality of CoSBs;
    configuring each of said plurality of partitions to include a second plurality of CoSs such that a sum of minimum required bandwidths of said second plurality of CoSs is less than a minimum bandwidth of cash of said partitions; and
    wherein a first aggregation of said first plurality of CoSs for said plurality of CoSBs is the same second aggregation of said and plurality of CoSs for said plurality of partitions.

9. The method of claim 8, wherein each of said plurality of CoSBs, each of said plurality of partitions, and each of said first plurality of CoSs include a maximum allowable bandwidth usage and a minimum bandwidth guarantee.

10. The method of claim 9, wherein the maximum allowable bandwidth is the maximum amount of bandwidth that each of said plurality of CoSBs, each of said plurality of partitions and each of said first plurality of CoSs can reserve.

11. The method of claim 9 wherein the minimum bandwidth guarantee is the guaranteed bandwidth assigned to each of said plurality of CoSBs, each of said plurality of partitions, and each of said first plurality of CoSs, such that the guarantee is not affected by bandwidth usage or configuration changes of any other of said plurality of CoSBs, each of said plurality of partitions and each of said first plurality of CoSs.

12. The method of claim 9 further comprising checking the minimum bandwidth guarantee of each of said plurality or CoSBs, each of said plurality of partitions, and each of said first plurality of CoSs.

13. The method of claim 9 further comprising checking the maximum bandwidth usage of each of said plurality of CoSBs, each of said plurality of partitions, and each of said first plurality of CoSs.

14. The method of claim 9 further comprising preventing a change in any of said plurality of CoSBs, said plurality of partitions and said first plurality of CoSs if said change would result in improper minimum bandwidth relationships for the line card.

15. An apparatus comprising:
  means for configuring a communication link of a network to include a plurality of logical interfaces such that a sum of minimum required bandwidths of said plurality of logical interfaces is less than a link capacity;
  means for configuring each of said plurality of logical interfaces to include a plurality of class of service buffers (CoSBs) such that a sum of minimum required bandwidths of said plurality of CoSBs is less than a minimum bandwidth of each of said plurality of logical interfaces;
  means for configuring each of said plurality of logical interfaces to include a plurality of partitions such that a sum of minimum required bandwidths of said plurality of partitions is less than a minimum bandwidth of each of said plurality of logical interfaces;
  means for configuring each of said plurality of CoSBs to include a first plurality of classes of service (CoS) such that a sum of minimum required bandwidths of said first plurality of CoSs is less than a minimum bandwidth of each of said plurality of CoSBs;
  means for configuring each of said plurality of partitions to include a second plurality of CoSs such that a sum of minimum required bandwidths of said second plurality of CoSs is less than a minimum bandwidth of each of said plurality of partitions; and
  wherein a first aggregation of said first plurality of CoSs for said plurality of CoSBs is the same as a second aggregation of said second plurality of CoSs for said plurality of partitions.

16. The apparatus of claim 15, wherein each of said plurality of CoSBs, each of said plurality of partitions, and each of said first plurality of CoSs include a maximum allowable bandwidth usage and a minimum bandwidth guarantee.

17. A computer readable medium having instructions which, when executed by a processing system, cause the system to perform a method comprising:
  configuring a communication link of a network to include a plurality of logical interfaces such that a sum of minimum required bandwidths of said plurality of logical interfaces is less than a link capacity;
  configuring each of said plurality of logical interfaces to include a plurality of partitions such that a sum of minimum required bandwidths of said plurality of partition is less than a minimum bandwidth of each of said plurality of logical interfaces;
  configuring each of said plurality of CoSBs to include a first plurality of classes of service (CoS) such that a sum of minimum required bandwidths of said first plurality of CoSs is less than a minimum bandwidth of each of said plurality of CoSBs;
  configuring each of said plurality of partitions to include a second plurality of CoSs such that a sum of minimum required bandwidths of said second plurality of CoSs is less than minimum bandwidth of each of said plurality of partitions; and
  wherein a first aggregation of said first plurality of CoSs for said plurality of CoSBs is th same as a second aggregation of said and plurality of CoSs for said plurality of partitions.

18. The medium of claim 17, wherein each of said plurality of CoSBs, each of said plurality of partitions, and each of said first plurality of CoSs include a maximum allowable bandwidth usage and a minimum bandwidth guarantee.

19. The medium of claim 18, wherein the maximum allowable bandwidth is the maximum amount of bandwidth that each of said plurality of CoSBs, each of said plurality of partitions, and each of said first plurality of CoSs can reserve.

20. The medium of claim 18, wherein the minimum bandwidth guarantee is the guaranteed bandwidth assigned to each of said plurality of CoSBs, each of said plurality of partitions and each of said first plurality of CoSs, such that the guarantee is not affected by bandwidth usage or configuration changes of any other of said plurality of CoSBs, each of said plurality of partitions, and each of said first plurality of CoSs.

21. The medium of claim 18, wherein the executed instructions cause the system to further perform: checking the minimum bandwidth guarantee of each of said plurality of CoSBs, each or said plurality of partitions, and each of said first plurality of CoSs.

22. The medium of claim 18, wherein the executed instructions further cause the system to perform: checking the maximum bandwidth usage of each of said plurality of CoSBs, each of said plurality of partitions, and each of said first plurality of CoSs.

23. The medium of claim 18, wherein the executed instructions further cause the system to perform: preventing a change in any of said plurality of CoSBs, said plurality of partitions and said first plurality of CoSs if said change would result in improper minimum bandwidth relationships for the line card.

24. An apparatus comprising a controller to:
  configure a communication link of a network to include a plurality of logical interfaces such that a sum of minimum required bandwidths of said plurality of logical interfaces is less than a link;
  configure each of said plurality of logical interfaces to include a plurality of class of service buffers (CoSBs) such that a sum of minimum required bandwidths of said plurality or CoSBs is less than a minimum bandwidth of each of said plurality of logical interfaces;
  configure each of said plurality of logical interfaces to include a plurality of partitions such that a sum of minimum required bandwidths of said plurality of partitions is less than a minimum bandwidth of each of said plurality of logical interfaces;
  configure each of said plurality of CoSBs to include a first plurality of classes of service (CoS) such that a sum of minimum required bandwidths of said first plurality of CoSs is less than a minimum bandwidth of each of said plurality of CoSBs;
  configure each of said plurality of partitions to include a second plurality of CoSs such that sum of minimum required bandwidths of said second plurality of CoSs is less than a minimum bandwidth of each of said plurality of partitions; and wherein a first aggregation of said first plurality of CoSs for said plurality of CoSBs is the same as a second aggregation of said second plurality of CoSs for said plurality of partitions.

25. The apparatus of claim 24, wherein each of said plurality of CoSBs, each of said plurality of partitions, and each of said first plurality of CoSs include a maximum allowable bandwidth usage and a minimum bandwidth guarantee.

* * * * *